(No Model.) 3 Sheets—Sheet 2.

G. P. CAMPBELL.
SWEEPER FOR RAILWAYS.

No. 391,509. Patented Oct. 23, 1888.

WITNESSES:
J. C. Clark.
C. Sedgwick.

INVENTOR:
G. P. Campbell
BY
Munn & Co.
ATTORNEYS.

(No Model.) 3 Sheets—Sheet 3.
G. P. CAMPBELL.
SWEEPER FOR RAILWAYS.

No. 391,509. Patented Oct. 23, 1888.

WITNESSES:

INVENTOR:
G. P. Campbell
BY Munn & Co
ATTORNEYS.

UNITED STATES PATENT OFFICE.

GEORGE P. CAMPBELL, OF NEW YORK, N. Y.

SWEEPER FOR RAILWAYS.

SPECIFICATION forming part of Letters Patent No. 391,509, dated October 23, 1888.

Application filed December 9, 1887. Serial No. 257,449. (No model.)

*To all whom it may concern:*

Be it known that I, GEORGE P. CAMPBELL, of the city, county, and State of New York, have invented a new and Improved Sweeper for Railways, of which the following is a full, clear, and exact description.

My invention relates to an improvement in railway-sweepers, and has for its object to provide a sweeper of simple and strong construction, effective in operation, and conveniently and expeditiously handled.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1:
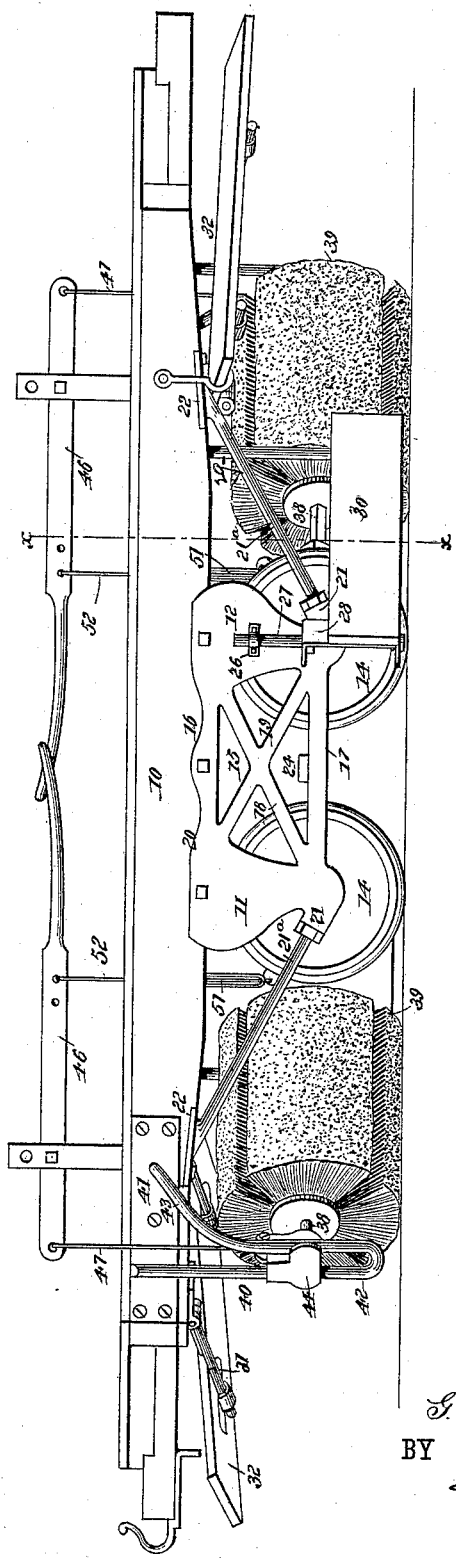
Figure 2:
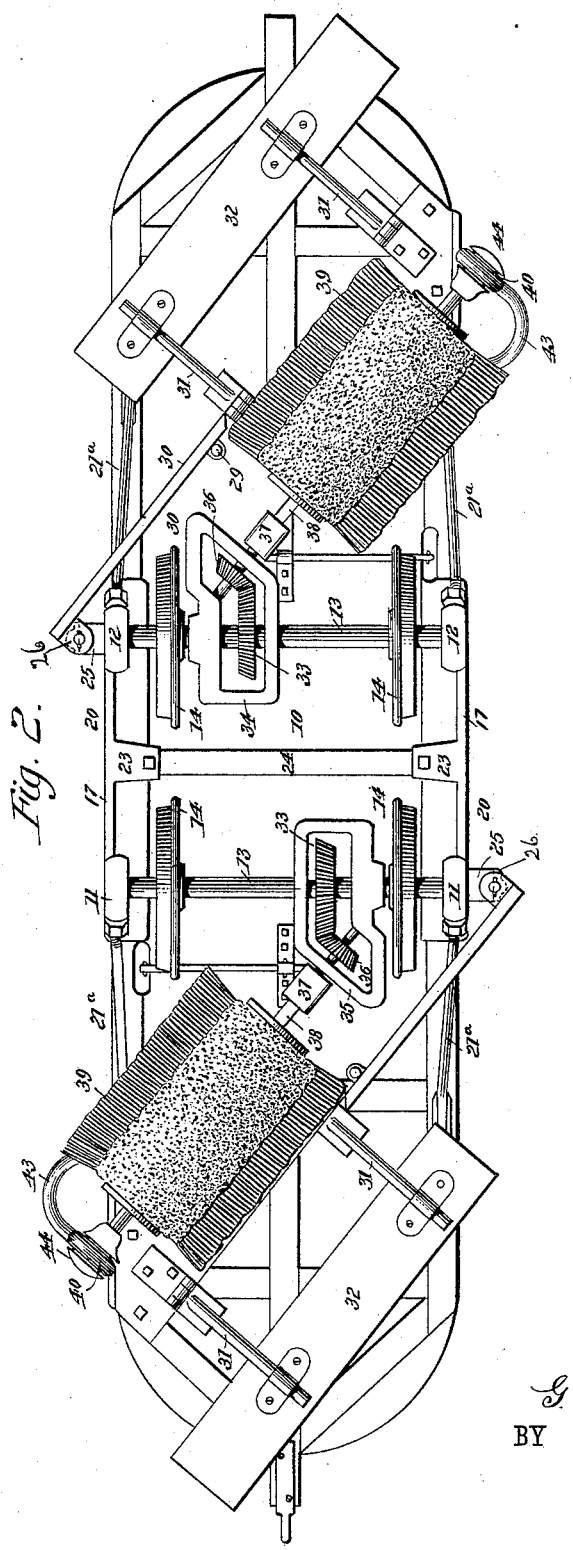
Figure 3:
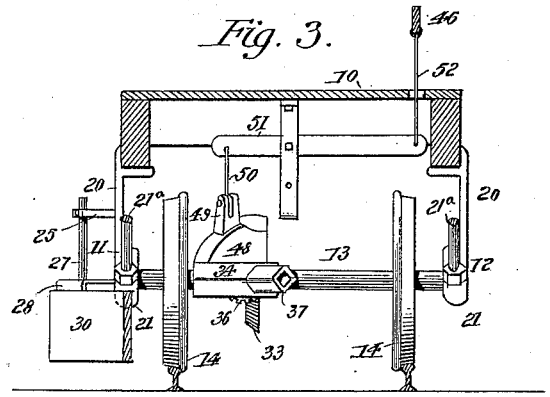
Figure 4:
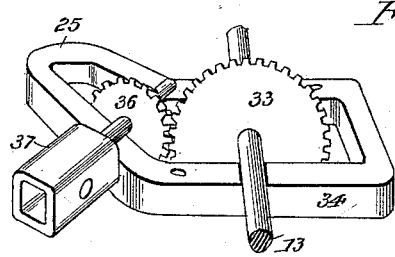
Figure 5:
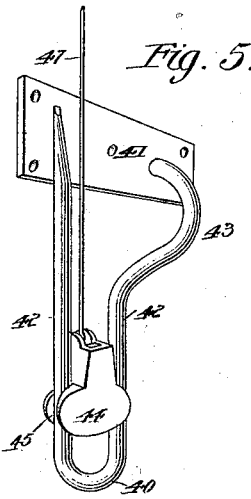

Figure 1 is a side elevation of the sweeper; Fig. 2, a bottom plan view; Fig. 3, a transverse vertical section on line *x x* of Fig. 1. Fig. 4 is a detail perspective view of the gearing-box, and Fig. 5 is a perspective view of one hanger.

In carrying out the invention I attach about centrally to the body or platform 10, at each side, aligning sections 11 and 12, forming the pedestal 20, provided with the usual boxes adapted to receive the axles 13 of the wheels 14. The pedestals of the two axles upon each side of the platform are constructed of pieces of metal cast, forged, or otherwise produced, the metal being so manipulated that the individual pedestals are removed from each other, as best shown in Fig. 1, provided with intervening and integral braces 15, the same being preferably so arranged as to form parallel and horizontal top and bottom braces, 16 and 17, and diagonal cross-braces 18 and 19. Thus the two pedestals are combined in one frame, producing a practically dual, yet virtually a single, pedestal, 20, having spaced bearings for two axles.

Integral with the lower outer ends of the pedestals 20 upwardly-inclined projections or lugs 21 are provided, into which or to which lugs one end of a hollow or tubular truss, 21ª, is attached in any approved manner, and the other ends of the truss is attached to an inclined flat plate, 22, the said plate fitting into upwardly-inclined recesses in the under edge of the body 10, and is secured thereto by screws, bolts, or other equivalent fastening devices, as also best shown in Fig. 1.

In order to further strengthen and brace the aligning pedestals 20, a horizontal integral boss, 23, is formed centrally upon the inner face of the bottom brace, 17, having a groove upon the upper side adapted to receive one end of a tie-bar, 24, which bar is secured to the respective bosses, and made to exte d transversely beneath the body between and parallel with the axles, as shown in Fig. 2.

A pedestal constructed as above described is not only stronger than the pedestals heretofore used, but when employed the axles of each set of wheels may be brought closer together than ordinary, and consequently more room be obtained beneath the body.

Upon the outer face of section 12 of the pedestal 20, upon one side of the body and the section 11 of the opposing pedestal, vertically aligning and spaced horizontal ears 25 are formed, which ears are provided with a semi-circular recess in their outer ends, and a detachable cap, 26, similarly recessed, secured thereon, whereby hangers or bearings are produced for a vertical shaft, 27, and upon the shaft 27 a U-shaped strap, 28, is held, one end of the strap being located above the lower bearing or hanger, 25, the end embracing the said shaft 27 at or near the lower end held in position by a pin passing through the latter.

To a sill of the frame outside of the wheels, and between the center thereof and the side upon which the respective hangers 25 are located, a vertically downwardly-projecting shaft, 29, is fixed, upon which shaft one end of a mold-board, 30, is adapted to slide through the medium of a sleeve upon the latter. The other end of the mold-board being secured to the aforesaid strap 28, the board is thus held at an inclination inward from the outer side across the track, as illustrated in Fig. 2.

The mold-board upon one side of the wheels or at one end of the body, it will be observed, projects outward in opposite directions, although located in parallel planes, one mold-board being located over one rail and the other over the opposite rail. The mold-boards are preferably lowered to such an extent as that their lower edges clear the rails only, and by means of their arrangement upon the shafts 27 and 28 they have sufficient vertical play to clear any obstruction upon or near the rail that they cannot remove.

To the under side of the body 10 spaced bars or shafts 31 are hinged, which shafts align the fixed shafts 27 and 29, and upon the hinged shafts 31 a second mold-board, 32, is held, preferably to slide therein. Thus when the mold-board 32 is in a vertical position, overlapping the fixed mold-board 30, the two form a continuous diagonal line at each end of the body. The normal position of the hinged mold-board 32 is, as illustrated in Fig. 2, elevated and secured horizontally to the body by hooks or equivalent retaining devices, the said hinged mold-boards being only lowered when the snow upon the track is extraordinarily deep or drifted.

Upon the axles 13, upon opposing ends and between the wheels, bevel-gears 33 are keyed, which gears are inclosed within angular boxes 34, loosely journaled upon the axle. Within the short arm 35 of the box, or that arm extending outward at an angle to the gear 33, a pinion, 36, is journaled, meshing with the aforesaid gear 33, and to one trunnion of the said gear 33 and extending outward from the box a rectangular socket, 37, is attached, as illustrated in Figs. 3 and 4.

The shafts 38, carrying the brooms 39, are secured at one end in the sockets 37, which shafts are projected parallel with the respective mold-boards 30 and 32 to a bearing at the other end in hangers 40, attached to the side of the car-body 10 near the ends. Thus the shafts 38 extend at each end of the car-body in opposite directions, yet in parallel planes outward beyond said body, to cover the opposite rails of the track.

The hangers 40 consist of a horizontal plate, 41, by which the same are secured to the car-body, and an integral downwardly-projecting U-shaped bar, 42, so bent as to stand at an angle to the plate, and consequently to the body 10, the inner member of the said U-shaped bar being curved substantially horizontally outward at the top and inward to a union with the plate, as illustrated at 43 in Figs. 1 and 5. Between the members of the hangers the outer journal-box, 48, of the broom-shaft is adapted to slide, the same being fitted, to that end, with grooves 45 upon opposing sides, which grooves receive the members of the hangers 42, as shown in Fig. 5.

Hand-levers 46 are fulcrumed upon the body at each end upon opposite sides, their handles approaching each other, as illustrated in Fig. 1, the outer ends of the said levers being united with the outer sliding boxes of the broom-shafts by a vertical connecting-rod, 47.

In order to protect the gearing 33 and 34 upon the axles and prevent the snow and ice interfering with their action, a cap, 48, is provided for the box 34, detachably secured thereto by bolts or in any other suitable manner, which cap is preferably grooved upon the under face, as shown in Fig. 4, to present upper bearing-surfaces for the axle 13 and the trunnions of the pinion 36.

To retain the capped box 34 in substantially a horizontal position, the upper or cap portion is provided with integral vertical ears 49, or an eye, if desired, between which ears one end of a connecting-rod, 50, is pivoted, the other end being united to one extremity of a short horizontal lever, 51, fulcrumed beneath the body, as illustrated in Fig. 3, the opposite extremity of the said lever 51 being connected by a rod, 52, with the hand-lever 46 inside the fulcrum of said lever.

It will be thus understood that by the manipulation of the hand-levers 46 the brooms may be elevated or depressed equally at both ends as and when found desirable. I desire it distinctly understood that while the form of hanger 40 shown is my preferred construction I do not confine myself exclusively to the use thereof, as many other suitable and well-known hangers may be substituted, as in practice it be found desirable.

In operation, should the track be covered with an ordinary fall of snow, both the hinged mold-boards are elevated and secured prior to starting, and both brooms are lowered. As the machine advances, the forward broom cleans a portion of the space between the track and one rail, the advance mold-board cleaning the bulk of the snow from the remaining space and from the track. The said mold-board also prevents the backing up of the snow delivered by the advance broom, whereby the rear broom, which, following, cleaning the space uncovered by the mold-board, has not as much work to perform as in sweepers of the ordinary construction. By the use of the advance mold-board, also, and in view of the above, the sweeper may be drawn in comparative ease by an ordinary team.

When the snow has fallen to a great depth, or drifted badly over the track, the advance hinged mold-board is lowered, which, in conjunction with the advance fixed mold-board, constitutes substantially one board extending diagonally the entire track. In this event the advance broom is elevated and, although revolving, does no work. Thus the bulk of the accumulation of snow is thrown from the track by the advance mold-boards with ease, and the greatest portion of the space between the track and one rail is additionally cleaned by the rear broom.

The sweeper may be advanced from either end with equally good effect, and, if desired, the hinged mold-board may be raised and released by means of any ordinary combination of levers, and I contemplate so manipulating the hinged mold-board from the body of the sweeper.

The ears or hangers 21 and the pedestal being cast in one piece greatly lessens the cost and labor of manufacture, and the said hangers being provided with detachable caps admit of the speedy removal of the mold-board shafts without jacking up the frame, which latter operation is attended with great inconvenience, owing to the weight thereof.

In respect to the combination of parts specified in the first of the claims hereinafter made, I will state that the novelty consists in the adaptation for vertical adjustment of the broom and the means for effecting it.

Having thus fully described my invention, I claim as new and desire to secure by Letters Patent—

1. The combination, with the body, the axles, the U-shaped hangers secured to the body at opposite sides near the ends, and a journal-box sliding in said hangers, of a gear-wheel attached to the axles near opposite ends, an angular capped box inclosing said gear pivoted upon the axle, a pinion journaled in said box meshing with the said gear and provided with an attached socket, a rotary broom supported in said socket and journal-box diagonally beneath the body, a fixed mold-board held parallel with and at one end of the broom, and means for manipulating the broom, substantially as herein shown and described.

2. The combination, with the body, the axles, U-shaped hangers secured to the body at opposite sides near the ends, and a journal-box sliding in said hangers, of a gear-wheel attached to the axles, an angular capped box inclosing said gear pivoted upon the axle, a pinion journaled in said box meshing with the gear and provided with an attached socket, a rotary broom supported in said socket and journal-box diagonally beneath the body, a fixed mold-board held parallel with and at one end of the broom, a second mold-board hinged to the body parallel with and in front of the brooms, and means, substantially as described, for manipulating the broom, as and for the purpose set forth.

3. In a railway-sweeper, the combination, with the body, the axles, U-shaped hangers, arranged at an angle with the body and integral with horizontal plates secured to the body at opposite sides near the ends, and having one member curved to form a brace, and a journal-block sliding in said hangers, of a gear-wheel attached to the axles, an angular box provided with a detachable cap inclosing said gear, a pinion journaled in said box meshing with the gear and provided with an attached socket, a rotary broom supported in said sockets and journal-boxes, and levers fulcrumed upon the body connected with the angular box and sliding journal-box, substantially as and for the purpose herein set forth.

4. In a railway-sweeper constructed substantially as herein shown and described, the combination, with the body, of pedestals made in a single piece provided with central integral braces, a truss attached at each end of the pedestals and to the body, and spaced and parallel axles journaled in said pedestals, substantially as shown and described, whereby two pedestals, one upon either side of the body, are employed for two spaced axles, as set forth.

5. In a railway-sweeper constructed substantially as herein described, the combination, with the body, of pedestals made in a single piece secured at opposite sides of the body, having central integral braces and a horizontal grooved boss integral with the inner face, a tubular truss secured at each end of the pedestals and to the body, spaced and parallel axles journaled in said pedestals, and a brace intervening the axles and secured in the said grooved base, substantially as shown and described.

6. In a railway-sweeper constructed substantially as shown and described, the combination, with the axles, a gear-wheel secured to the axle, a box held upon the axle surrounding the said gear-wheel, a pinion journaled in said box meshing with the gear, and a detachable cap covering said box, of hangers secured upon the body of the sweeper, and a brush journaled in said hangers and secured to the trunnions of the said pinion, substantially as shown and described.

7. In a railway-sweeper constructed substantially as herein shown and described, a hanger consisting of the plate 41, the integral U-shaped bar 42, fixed at an angle to the plate, having one member of said bar curved at the top outwardly and inwardly to its connection with the plate, substantially as shown and described, whereby a hanger and brace therefor are combined, as and for the purpose set forth.

8. The combination, with pedestals, of integral horizontal hangers and caps detachably secured to said hangers, substantially as described.

9. The combination, with pedestals constructed of a single piece, of horizontal hangers integral with the outer face and caps detachably secured to said hangers, substantially as described.

GEORGE P. CAMPBELL.

Witnesses:
 SIDNEY L. ROWLAND,
 WILLIAM H. WAYNE.